United States Patent [19]

Braukmann

[11] 3,952,946

[45] Apr. 27, 1976

[54] THERMOSTATIC VALVE

[76] Inventor: Bernhard W. Braukmann, Am Rosenberg 1, 6950 Mosbach, Germany

[22] Filed: July 12, 1974

[21] Appl. No.: 488,153

[52] U.S. Cl. .................................. 236/34; 251/322
[51] Int. Cl.² ........................................... F01P 7/02
[58] Field of Search ................. 236/34.5, 34, 23 A; 251/322; 137/543.17

[56] References Cited
UNITED STATES PATENTS

| | | | |
|---|---|---|---|
| 3,658,243 | 4/1972 | Beatenbough et al. | 236/34 |
| 3,817,450 | 6/1974 | Mischke | 236/34.5 |

*Primary Examiner*—William E. Wayner
*Attorney, Agent, or Firm*—William T. Howell

[57] ABSTRACT

A thermostatic valve comprises a housing having a valve seat and opposed openings in its wall for circulating coolant; a spring surrounds the housing and a valve plate is positioned for abutment against and retraction from the seat with the valve plate supporting a thermostatic operating element which bears against the inner surface of the housing to activate the valve plate depending on the temperature of the coolant. The valve plate has elastic arms, each arm having a free end to interfit into one of the opposed openings in the housing. The valve plate is assembled with the housing by force fitting the elastic arms into the openings and a compressive spring surrounding the housing is held in position between the protruding flanks of the housing and the outwardly extending projection of the arms in the openings.

5 Claims, 1 Drawing Figure

U.S. Patent April 27, 1976 3,952,946
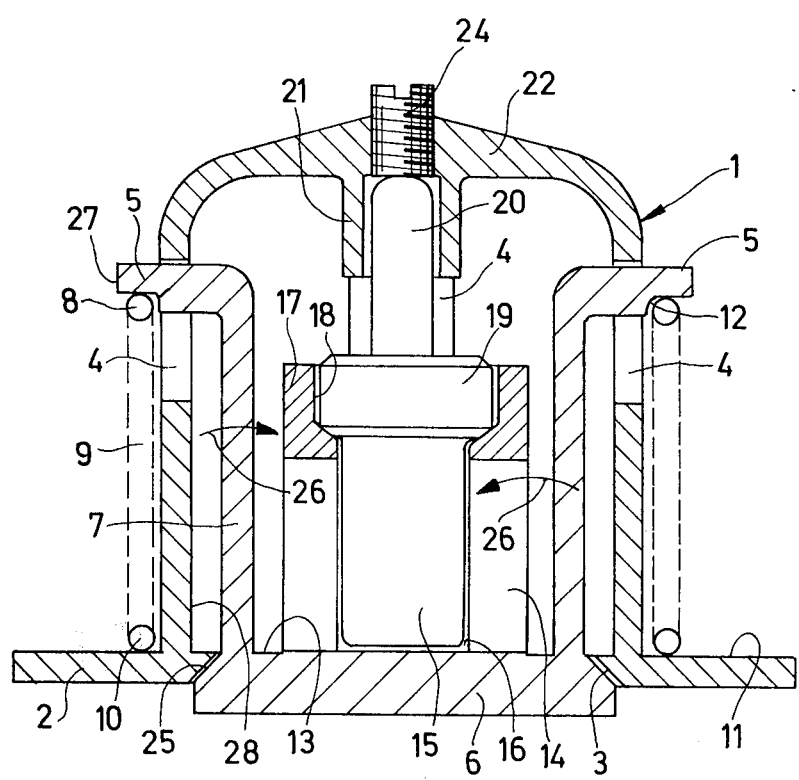

THERMOSTATIC VALVE

FIELD OF INVENTION

The present invention relates to a thermostat valve for use with heat engines to ensure a cool circulation of fluid within the engine. The valve consists of a housing having a valve seat and a step through opening to ensure a median cooling characteristic.

PRIOR ART

Thermostat valves as above described are already known and are becoming more common due to the quantity thereof being currently manufactured. There is a demand then, for quantity production of thermostat valves. Small economies have been worked out on material and assembly costs and the object of the present invention is to provide a new and useful construction to cut down the high cost of assembly. One method used is to make the housing collapsible. The construction of such thermostat valves has, therefore, become simplified yet it has the disadvantage that the cost of the housing has become quite expensive.

The principal object of the present invention is to create a thermostat valve that consists of as few parts as possible and is quickly and easily assembled. The invention herein proposes that the valve plate can be set in either one of two positions around 180° and has elastic bending arms, which when free interfit into slits formed around the casing and in assembly can be carried through from the inside to the outside of the housing with their ends directed in opposite directions. The arms also form on their outer ends supporters for the end of a spring which is bent around the housing. By simply bending the elastic part of the lock device a valve plate which carries the arms can be interfitted to the housing. The transfer of the spring to the outside of the case will provide an assembly for a thermostat valve that results in low cost and extremely easy assembly. The spring is turned up over the housing such that an assembler could put the valve plate together with the arms and with the thermostatic working element from the valve seat of the assembly. It is essential of course that suitable holding members or conductors must be provided for the working elements to guarantee complete, accurate positioning of the element after assembly of the housing. The arms are arched inwardly of the valve and are supported by the joining of their free ends inside of the housing. While being arched and as soon as they have reached the lengthwise slits they spring outward and bind on to the foundation through to the outside by their own elasticity. The spring is held by the ends of the arms let through the housing in a compressed position. As soon as the arms, with their free ends supporting the spring, have taken up their final position, the spring is freed so that it can bear on the extention of the housing frame. The thermostat valve will then operate under the usual conditions.

The slits along the housing are suitably dimensioned to receive the arms and for the inter-fitting of the necessary valve hub. The ends of the arms when lying in the open position can simultaneously be used like affixed parts for the opening motion. To obtain a closure of the valve, the arms will however not come to position on the other end position on the opposite place slit ends. The slit ends turned into the valve seat support by a spring breach, the valve plate with all the parts and elements fastened thereon.

The thermostat valve of the present invention is provided with a clamping or mounting plate formed on the housing for supporting the other of the spring ends. The spring is the type of a well known compression type spring formed in a spiral and fits or lies in the present invention on the outriding arms. The mounting flank then becomes an, in addition to its holding function, spring supporter also.

Preferably the working element is found between the arms or the arms themselves are arranged around the working element. The arms must be spaced apart such that the lateral distance between them is sufficient to allow the arms to be bent past the assembly.

A further advantage and object of the invention is that the housing of the working element is formed into a bow shaped holder and is centrally positioned on the lock device. It is also an advantage for it to be formed in pieces. Another variation of the invention is thus characterized in that the working element especially its piston is adjacently supported and screwed on to the housing in the usual way.

A thermostat valve constructed as above will facilitate the assembly not only of a unified structure but also of an efficient production of the valve during manufacture.

It will be seen that it is an advantage that the slit along the casing will simultaneously form coolant openings through the middle of the housing. The casing can also be built in a cage like form with additional slits as openings.

The seat, lock device, arms, holders and working elements are manufactured from synthetic material, to thereby allow for lower manufacturing costs and also to resist the high corrosion to which thermostat valves are often subjected.

With the considerations and inventive objects above set forth and such other as may become apparent from consideration of this disclosure and specification, the present invention consists of and is hereby claimed to reside in the inventive concept which is comprised, embodied, embraced or included in any method, construction, arrangement or combination of parts or new use of any of the foregoing which may herein be exemplified in one or more specific embodiments of such concept reference being had to the accompanying drawings in which:

FIG. 1 is a vertical cross-section of the present invention.

In the drawings, like character references designate identical parts.

PREFERRED EMBODIMENT OF THE INVENTION

In FIG. 1 the housing is designated Number 1 and is shaped like a bell or a pot. The mounting or clamping flank 2 is shown projecting outwardly from a tapered or conical valve seat 3 and located below the housing. The housing possesses 4 lengthwise slits designated numeral 4, each set around 90° to one another and built on the valve plate 6. On the underside of these free arm ends 5 lie the end 8 of a bent-around or spiral spring 9 which is assembled concentric to the housing 1. The lower end of the compressed spiral spring 10 is supported on the upper side of the flank or projection 2 of the housing. The arm ends 5 have shoulders 12 formed therein into which seat the upper side of the compressed spring 9.

On the upper or inside of the valve plate 6 at position 13 a bow shaped holder 14 is formed for the positioning of the thermostat working element 15. For better circulation around the working element, a space 16 is provided therearound. The path 17 of the bent formed holder is tapered downwardly to a point below the drill 18 to support the housing truss 19 and for the position of the housing. A working piston 20 projects into the housing and is surrounded by a shell shaped projection 21 of housing 22. Screwed into the housing top 21 and concentric with the housing is a threadable bolt 24 to provide an adjustment means to the device.

For a pre-determined temperature of a coolant medium the tapered surface 25 of the valve plate 6 is established, so that surface 25 interfaces with surface 3 of the housing to form the seat for the device.

The coolant median flows upwards through the slits in the inside of the housing from over the thermostat working element. The ascending temperature of the coolant medium causes the housing of thermostat working element 15 to be shifted relative to its piston 20 as supported at the adjustment link 24. The valve plate 6 is thus raised from its seat 3, and simultaneously the spiral spring is compressed. With a reduction of the coolant medium temperature the spring releases pressure outwardly against the flanks 2 and the projections of supports 5.

The valve plate 6 with its arms 7 and the thermostat working element 15 set into holder 14 is constructed to allow the complete arm 7 to be compressed in the direction of arrows 26 in order to allow the front corners 27 of the free arm ends 5 to pass the narrowly built valve seat position 13 in the direction of arrows 26.

The arms during assembly spring into position by their own elasticity running through the valve seat 3 nearly to the outside and then support themselves on the inside flank of the housing 28. As soon as they have reached the slits along the case 4, they rebound in the outwardly pointing position as in the diagram. During assembly the compressed spiral spring previously mounted on flank 2 in a suitable manner and temporarily held down, is freed so that it can be established on the underside of the free arm ends 5.

Once assembled as above, a thermostat of the present invention will be ready for use once the adjustment nut 24 is set.

What is claimed is:

1. A thermostatic valve for use with heat engines employing a fluid circulating medium having a housing with opposed openings formed therethrough, a valve seat forming a further opening to said housing, spring means surrounding said housing, a valve plate positioned for abutment against and retraction from said seat, said valve plate supporting a thermostatically operable element which bears against the inside surface of said housing to activate said valve plate, a plurality of elastic bending arms to said valve plate, said arms being assembled from within said housing to protrude through said opposed openings and ends on said arms to form support members for one end of said spring means and outwardly formed flank members to said housing to support the other end of said spring means.

2. A thermostatic valve according to claim 1 wherein the operating thermostatic element is positioned between said elastic arms.

3. A thermostatic valve according to claim 2 wherein the thermostatic element is enclosed in a holder member centrally of said valve seat and modularly installed thereon.

4. A thermostatic valve as claimed in claim 1, wherein the thermostatic working element has a piston thereon centrally located within the housing of the thermostatic valve and being adjustable by a set screw nut centrally located on the upper housing of the valve.

5. A thermostatic valve as claimed in claim 1 wherein the openings in the housing are slit shaped and provide holding means for said support arms and simultaneously provide openings for circulation of a coolant medium.

* * * * *